(12) United States Patent
Shen et al.

(10) Patent No.: US 11,095,689 B2
(45) Date of Patent: Aug. 17, 2021

(54) SERVICE PROCESSING METHOD AND APPARATUS

(71) Applicant: Advanced New Technologies Co., Ltd., Grand Cayman (KY)

(72) Inventors: Tao Shen, Hangzhou (CN); Xin Lei, Hangzhou (CN); Hongfa Sun, Hangzhou (CN); Hai Huang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/721,814

(22) Filed: Dec. 19, 2019

(65) Prior Publication Data

US 2020/0128049 A1 Apr. 23, 2020

Related U.S. Application Data

(63) Continuation of application No. 15/968,593, filed on May 1, 2018, which is a continuation of application No. PCT/CN2016/103012, filed on Oct. 24, 2016.

(30) Foreign Application Priority Data

Nov. 2, 2015 (CN) .......................... 201510732329.1

(51) Int. Cl.
*H04L 9/00* (2006.01)
*H04L 29/06* (2006.01)
(Continued)

(52) U.S. Cl.
CPC ............ *H04L 63/205* (2013.01); *G06F 21/00* (2013.01); *G06F 21/55* (2013.01); *G06F 21/552* (2013.01);
(Continued)

(58) Field of Classification Search
CPC ....... G06F 2200/00; G07F 17/00; H04L 29/00
See application file for complete search history.

(56) References Cited

U.S. PATENT DOCUMENTS 8,396,927 B2 3/2013 Cai et al.
9,223,985 B2 12/2015 Eberlein et al.
(Continued)

FOREIGN PATENT DOCUMENTS

CN 101504745 8/2009
CN 101976419 2/2011
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Joseph P Hirl
*Assistant Examiner* — Leynna Truvan
(74) *Attorney, Agent, or Firm* — Fish & Richardson P.C.

(57) ABSTRACT

User data from a received service processing request initiated by a user for processing a service is parsed. Whether the user data is included in a trusted user list or a risky user list stored in a server for processing the service is determined. Whether the user data matches historical behavior data associated with the user based on a behavioral profile comparison rule model if the user data is not included in the trusted user list or the risky user list is determined. A risk type associated with the user data is determined if the user data fails to match the historical behavior data. A risk identification rule model associated with the risk type is determined based on the service requested. Risk identification is performed based on the user data using the determined risk identification rule model. The service is processed by the server based on a result of the risk identification.

20 Claims, 4 Drawing Sheets

(51) Int. Cl.
*G06F 21/55* (2013.01)
*H04L 29/08* (2006.01)
*G06Q 10/06* (2012.01)
*G06F 21/00* (2013.01)

(52) U.S. Cl.
CPC ....... *G06Q 10/0635* (2013.01); *H04L 63/101* (2013.01); *H04L 63/102* (2013.01); *H04L 63/1408* (2013.01); *H04L 63/1433* (2013.01); *H04L 67/02* (2013.01); *H04L 67/22* (2013.01)

(56) References Cited

U.S. PATENT DOCUMENTS

| | | | |
|---|---|---|---|
| 9,942,250 | B2* | 4/2018 | Stiansen ............. H04L 63/1416 |
| 2005/0097320 | A1 | 5/2005 | Golan et al. |
| 2006/0130147 | A1 | 6/2006 | Von-Maszewski |
| 2009/0254572 | A1* | 10/2009 | Redlich ................. G06Q 10/06 |
| 2011/0082767 | A1 | 4/2011 | Ryu et al. |
| 2013/0103944 | A1 | 4/2013 | Adams et al. |
| 2014/0025395 | A1 | 1/2014 | Averill et al. |
| 2018/0248918 | A1 | 8/2018 | Shen et al. |

FOREIGN PATENT DOCUMENTS

| | | |
|---|---|---|
| CN | 102769632 | 11/2012 |
| CN | 103092832 | 5/2013 |
| CN | 103123712 | 5/2013 |
| CN | 103714479 | 4/2014 |
| CN | 104202339 | 12/2014 |
| CN | 104392381 | 3/2015 |
| EP | 1875653 | 1/2008 |
| JP | 2008165632 | 7/2008 |
| JP | 2008257434 | 10/2008 |
| KR | 101160903 | 6/2012 |
| KR | 101186743 | 9/2012 |
| TW | 200921542 | 5/2009 |
| TW | 201614535 | 4/2016 |
| WO | WO 2014037818 | 3/2014 |

OTHER PUBLICATIONS

Extended Search Report issued in EP Application No. 16861444.4-1213 dated Jul. 23, 2018; 7 pages.
Gosha, Sitepoint.com [online], "5 Impressive Photography Styles and How to Nail Them," Sep. 2014, retrieved on Dec. 11, 2019, retrieved from URL<https://www.sitepoint.com/5-photography-styles-web-design-nail/>, 43 pages.
International Search Report by the International Searching Authority in International Application No. PCT/CN2016/103012 dated Jan. 20, 2017; 8 pages.
Japanese Office Action in Japanese Patent Appplication No. 2018-522511, dated Mar. 12, 2019, 11 pages (with Machine Translation).
Kato et al., "A Study on an Automatic Negotiation Method for User's Requests Considering Increased Risks," Graduate School of Engineering, Soka University, Multimedia, Distributed, Cooperative, and Mobile Symposium, 2006, 2006(6):65-68 (with Machine Translation).
Nakamoto, "Bitcoin: A Peer-to-Peer Electronic Cash System," www.bitcoin.org, 2005, 9 pages.
PCT International Preliminary Report on Patentability in International Application No. PCT/CN2016/103012, dated May 8, 2018, 9 pages (with English translation).
Search Report and Written Opinion in Singaporean Application No. 11201803636R, dated Nov. 8, 2018, 8 pages.
Zheng, "Users' Abnormal Behavior Detection Model," Computer Systems and Applications, Aug. 2009, 8:190-192 (with Machine translation).
Amariei et al., "Online Payments Market Guide 2014," The Paypers, Nov. 2014, pp. 1-217.
Barclaycard.co.uk [online], "Fraud Detection Module Advanced: Checklist," 2015, retrieved on Mar. 17, 2021 retrieved from URL<https://www.barclaycard.co.uk/content/dam/barclaycard/documents/business/accepting-payments/ePDQ_Fraud_detection_module_checking_FDMC.pdf>, 40 pages.
Barclaycard.co.uk [online], "Fraud Detection," 2014, retrieved on Mar. 17, 2021; retrieved from URL<https://www.barclaycard.co.uk/content/dam/barclaycard/documents/business/accepting-payments/ePDQ_Fraud_Detection_Module-FDM.pdf>, 17 pages.
Delamaire et al., "Credit Card Fraud and Detection Techniques: a review," Banks and Bank Systems, Sep. 2009, 4(2):57-68.
Herenj et al., "Secure Mechanism for Credit Card Transaction Fraud Detection sytem," International Journal of Advanced Research in Computer and Communication Engineering, Feb. 2013,2(2):1244-1248.
Kerr et al., "Online Transaction Fraud and Prevention Get More Sophisticated," Gartner, Jan. 2002, pp. 1-7.
Pavia et al., "Credit Card Incidents and Control System," International Journal of Information Management, Dec. 2012, 32(6):501-503.

* cited by examiner

SERVICE PROCESSING METHOD AND APPARATUS

This application is a continuation of a U.S. patent application Ser. No. 15/968,593, filed on May 1, 2018, which is a continuation of PCT Application No. PCT/CN2016/103012, filed on Oct. 24, 2016, which claims priority to Chinese Patent Application No. 201510732329.1, filed on Nov. 2, 2015, and each application is hereby incorporated by reference in its entirety.

TECHNICAL FIELD

The present application relates to the field of Internet technologies and, in particular, to a service processing method and apparatus.

BACKGROUND

With the development of Internet information technologies, it is increasingly common to provide users with business services over the Internet. There are also more business service scenarios. A network business service can bring convenience to the users along with certain risks. To ensure that the network business service can be effectively provided, risk-monitoring systems are configured to perform risk identification upon users' service processing requests.

With increasing complexity of risks and service scenarios that require risk monitoring using risk monitoring systems, higher risk monitoring requirements and time-effectiveness are demanded. There are more rule models for risk identification with higher calculation complexity. Consequently, system resource and computational time consumption for the risk monitoring system increase significantly.

As such, a more suitable risk monitoring method is needed to improve risk analysis performance and reduce system resource consumption.

SUMMARY

Embodiments of the present application provide a service processing method and apparatus to reduce system resource consumption and improve risk identification performance.

An embodiment of the present application provides a service processing method, including: after a service processing request of a user is received, performing fast risk identification on the service processing request based on an identification algorithm of a fast risk identification layer; after the fast risk identification is performed, if it cannot be determined whether the service processing request is risky, performing deep risk identification on the service processing request based on an identification algorithm of a deep risk identification layer, where a data volume used for the deep risk identification is greater than a data volume used for the fast risk identification, where duration of the deep risk identification is greater than duration of the fast risk identification; and processing the service processing request based on a result of the deep risk identification.

Optionally, the performing fast risk identification on the service processing request based on an identification algorithm of a fast risk identification layer includes:
determining, based on user data included in the service processing request, whether the user data is user data included in a pre-stored trusted user list or risky user list; and if the user data is the user data included in the trusted user list, determining that the service processing request is safe; or if the user data is the user data included in the risky user list, determining that the service processing request is risky.

Optionally, if the user data is neither the user data included in the pre-stored trusted user list, nor the user data included in the pre-stored risky user list, the performing fast risk identification on the service processing request based on an identification algorithm of a fast risk identification layer further includes: determining, based on the user data included in the service processing request, historical behavior data of the user, and a rule model used for user behavior profile comparison, whether current operational behavior of the user indicated by the service processing request matches historical habitual operational behavior of the user; and if yes, determining that the service processing request is safe; if not, determining that the service processing request is risky.

Optionally, the performing deep risk identification on the service processing request based on an identification algorithm of a deep risk identification layer includes: selecting at least one risk type from a plurality of predetermined risk types based on a service processing type of the service processing request; selecting, for each selected risk type based on service scenario information corresponding to the service processing request, a rule model used for second-level risk identification; and performing deep risk identification on the service processing request based on the selected rule model.

Optionally, the method further includes: performing comprehensive risk identification on the service processing request based on an identification algorithm of a comprehensive risk identification layer, where the comprehensive risk identification, the fast risk identification, and the deep risk identification are asynchronously performed. Data volume used for the comprehensive risk identification is greater than the data volume used for the fast risk identification and the data volume used for the deep risk identification, and duration of the comprehensive risk identification is greater than the duration of the fast risk identification and the duration of the deep risk identification; and updating one or more of the following information based on a result of the comprehensive risk identification: the predetermined trusted user list; the predetermined risky user list; the historical behavior data of the user; or the predetermined rule model.

An embodiment of the present application provides a service processing apparatus, including: a first identification module, configured to: perform fast risk identification on the service processing request based on an identification algorithm of a fast risk identification layer, after a service processing request of a user is received; a second identification module, configured to: after the fast risk identification is performed, if it cannot be determined whether the service processing request is risky, perform deep risk identification on the service processing request based on an identification algorithm of a deep risk identification layer, where a data volume used for the deep risk identification is greater than a data volume used for the fast risk identification, and duration of the deep risk identification is greater than duration of the fast risk identification; and a processing module, configured to process the service processing request based on a result of the deep risk identification.

The previously described risk identification method and apparatus provide a solution for performing hierarchical risk identification on the service processing request of the user. At the fast risk identification layer, the identification is performed by using a relatively small amount of data and a short identification time. If it cannot be determined whether the service processing request is risky, the deep risk identification is performed by using more data and a longer time. A relatively obvious risky request or safe request can be quickly identified at the fast risk identification layer by using a small amount of data. Therefore, compared with direct execution of a complex risk identification algorithm, in the embodiments of the present application, identification efficiency can be improved, and system resource consumption can be reduced. In addition, relatively complex deep risk identification can be performed on a service processing request that cannot be easily identified, thereby ensuring risk identification accuracy.

In addition, a preferred implementation of the present application further provides a method of performing comprehensive risk identification based on an identification algorithm of a comprehensive risk identification layer. The comprehensive risk identification, the fast risk identification, and the deep risk identification are asynchronously performed, so as to optimize an entire risk identification algorithm while ensuring smooth service processing.

BRIEF DESCRIPTION OF DRAWINGS

To describe the technical solutions in embodiments of the present application more clearly, the following briefly introduces the accompanying drawings required for describing the embodiments. Apparently, the accompanying drawings in the following description show merely some embodiments of the present application, and a person of ordinary skill in the art can still derive other drawings from these accompanying drawings without creative efforts.

DESCRIPTION OF EMBODIMENTS

In embodiments of the present application, hierarchical risk identification is performed on a service processing request of a user. At a fast risk identification layer, identification is performed by using a small amount of data and a short identification time. If it cannot be determined whether the service processing request is risky, deep risk identification is performed by using more data and a longer time. A relatively obvious risky request or safe request can be quickly identified at the fast risk identification layer by using a small amount of data. Compared with direct execution of a complex risk identification algorithm, in the embodiments of the present application, identification efficiency can be improved, and system resource consumption can be reduced. In addition, relatively complex deep risk identification can be performed on a service processing request that cannot be easily identified, thereby improving risk identification accuracy. In addition, a preferred implementation of the present application further provides a method of performing comprehensive risk identification based on an identification algorithm of a comprehensive risk identification layer. The comprehensive risk identification, the fast risk identification, and the deep risk identification are asynchronously performed, so as to optimize an entire risk identification algorithm while ensuring smooth service processing.

The following further describes the embodiments of the present application in detail with reference to accompanying drawings in the specification.

Embodiment 1

Figure 1:
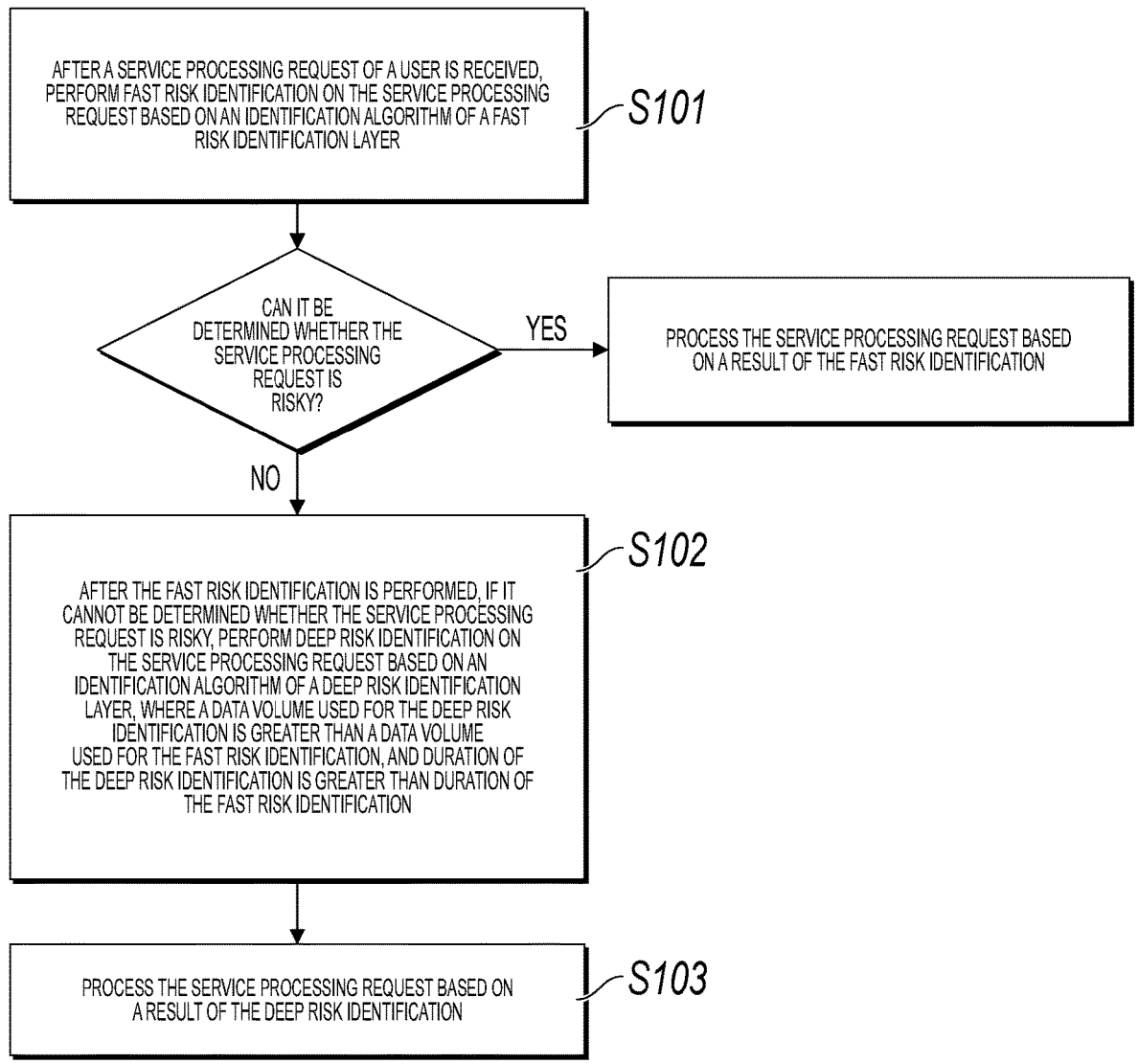
FIG. 1 is a flowchart illustrating a service processing method, according to a first embodiment of the present application.

As shown in FIG. 1, FIG. 1 is a flowchart illustrating a service processing method, according to Embodiment 1 of the present application. The method includes the following steps.

S101. After a service processing request of a user is received, perform fast risk identification on the service processing request based on an identification algorithm of a fast risk identification layer.

In a specific implementation of the method, the fast risk identification can first be performed on the service processing request based on a pre-stored trusted user list and risky user list. Here, the trusted user list can include user data such as a trusted Internet Protocol UP) address, a trusted Media Access Control (MAC) address, and a trusted terminal location. Correspondingly, the risky user list can include user data such as a risky application account, a risky bank card number, and a risky IP address. If user data in the service processing request is neither user data in the trusted user list, nor user data in the risky user list, the fast risk identification can continue to be performed through user behavior profile comparison, based on the user data included in the service processing request and historical behavior data of the user. If whether the service processing request is risky can be determined through the user behavior profile comparison, the service processing request is processed based on a result of the fast risk identification; otherwise, S102 is performed.

For example, whether an IP address currently used by a user to initiate a service processing request is a trusted IP address frequently used by the user can be determined first (a user account can be used to identify the user). If yes, it is considered that the current service processing request is risk-free. If not, whether the IP address is risky is determined. If yes, it indicates that the current service processing request is risky. If not, whether a current operation is risky can be determined based on a predetermined rule model used for user behavior profile comparison and by comparing current operational behavior of the user and historical habitual operational behavior of the user. For example, under the rule model, whether a current operation time of the user is within a historical habitual operation time period of the user, a status of matching between a current transaction item type of the user and a historical transaction interest of the user, or a status of matching between a current password input speed of the user and a password input habit of the user can be determined. Here, the historical habitual operational behavior of the user can be operational behavior in the user's historical behavior record that has occurred more often than a predetermined threshold. If a determined result of the rule model is that a difference between the current operational behavior of the user and the historical habitual operational behavior of the user is large, it is considered that the current service processing request is risky; or if the difference is small, it is considered that the current service processing request is safe. If the difference is between a difference corresponding to risky behavior and a difference corresponding to non-risky behavior, whether the current service processing request is risky cannot be determined. In such case, deep risk identification can be performed.

Based on statistics, risk identification results of at least 80% of user operational behavior can be obtained at the fast risk identification layer. The fast risk identification layer uses a small data volume to perform small amount of calculation, and consumes fewer system calculation resources and storage resources. Therefore, risk analysis performance can be improved and unnecessary resource consumption can be reduced.

S102. After the fast risk identification is performed, if it cannot be determined whether the service processing request is risky, perform deep risk identification on the service processing request based on an identification algorithm of a deep risk identification layer, where a data volume used for the deep risk identification is greater than a data volume used for the fast risk identification, and duration of the deep risk identification is greater than duration of the fast risk identification.

Compared with the fast risk identification, a more refined, finer risk analysis is performed in the deep risk identification. To obtain a more refined rule model through matching, the deep risk identification uses a relatively large data volume. For example, used data includes information about a service processing type (for example, fund transfer, payment, or sending red packet), service scenario information (for example, information about transaction types such as instant transfer or secured transaction, payment methods such as balance payment, fast payment, or e-bank payment, types of logistics such as physical transaction or virtual transaction, or transaction parties such as proprietary merchant or third-party merchant), etc.

Specifically, the following steps can be performed.

Step 1: Select at least one risk type from a plurality of predetermined risk types based on a service processing type of the service processing request.

Here, the risk type includes, for example, an account theft risk (application registration account theft), a card theft risk (bank card theft), and a fraud risk (for example, modifying a bank card password of another user). For example, when the service processing type is payment, related risks possibly include the account theft risk, the card theft risk, and the fraud risk. Therefore, when a payment-type service is processed, the account theft risk, the card theft risk, and the fraud risk can be automatically selected. For another example, when the service processing type is transfer, the account theft risk and the card theft risk can be automatically selected.

Step 2: Select, for each selected risk type based on service scenario information corresponding to the service processing request, a rule model used for deep risk identification.

Here, different service scenarios can correspond to different rule models used for deep risk identification. It is possible that different risk types can correspond to different rule models used for deep risk identification even in the same service scenario. For example, instant transfer and the secured transaction (for example, pay at delivery) have different risk levels. Therefore, corresponding rule models used for deep risk identification are different. Similarly, balance payment and the fast payment can also correspond to different rule models used for deep risk identification. Moreover, account theft and card theft in secured transaction can correspond to different deep risk identification rule models.

Step 3: Perform the deep risk identification on the service processing request based on the selected rule model.

Here, rule model data selected through matching during deep risk identification can include a plurality of types of existing information available online, such as information indicating whether the user performs a remote operation and merchant operating status information.

In the present step, the rule model used for deep risk identification is selected for each selected risk type. If there is a plurality of selected risk types, the deep risk identification is performed for each risk type. If a risk identification result in any risk type is that the current service processing request is risky, it is considered that the current service processing request is risky.

S103. Process the service processing request based on a result of the deep risk identification.

In deep risk identification, more refined data calculation can be performed by using system resources saved from fast risk identification, so as to obtain a more accurate risk identification result. Deep risk identification only needs to be performed for a service processing request whose identification result cannot be determined in the fast risk identification. Therefore, the probability of failing to identify a risk can be reduced while the system resources can be saved.

Embodiment 2

In Embodiment 2 of the present application, a comprehensive risk identification layer is designed to further improve risk identification accuracy. The comprehensive risk identification process is asynchronously performed with fast risk identification and deep risk identification. That is, it does not affect the process of service processing. The result of comprehensive risk identification can be used to optimize user data and a rule model that are used for the fast risk identification and the deep risk identification.

Figure 2:
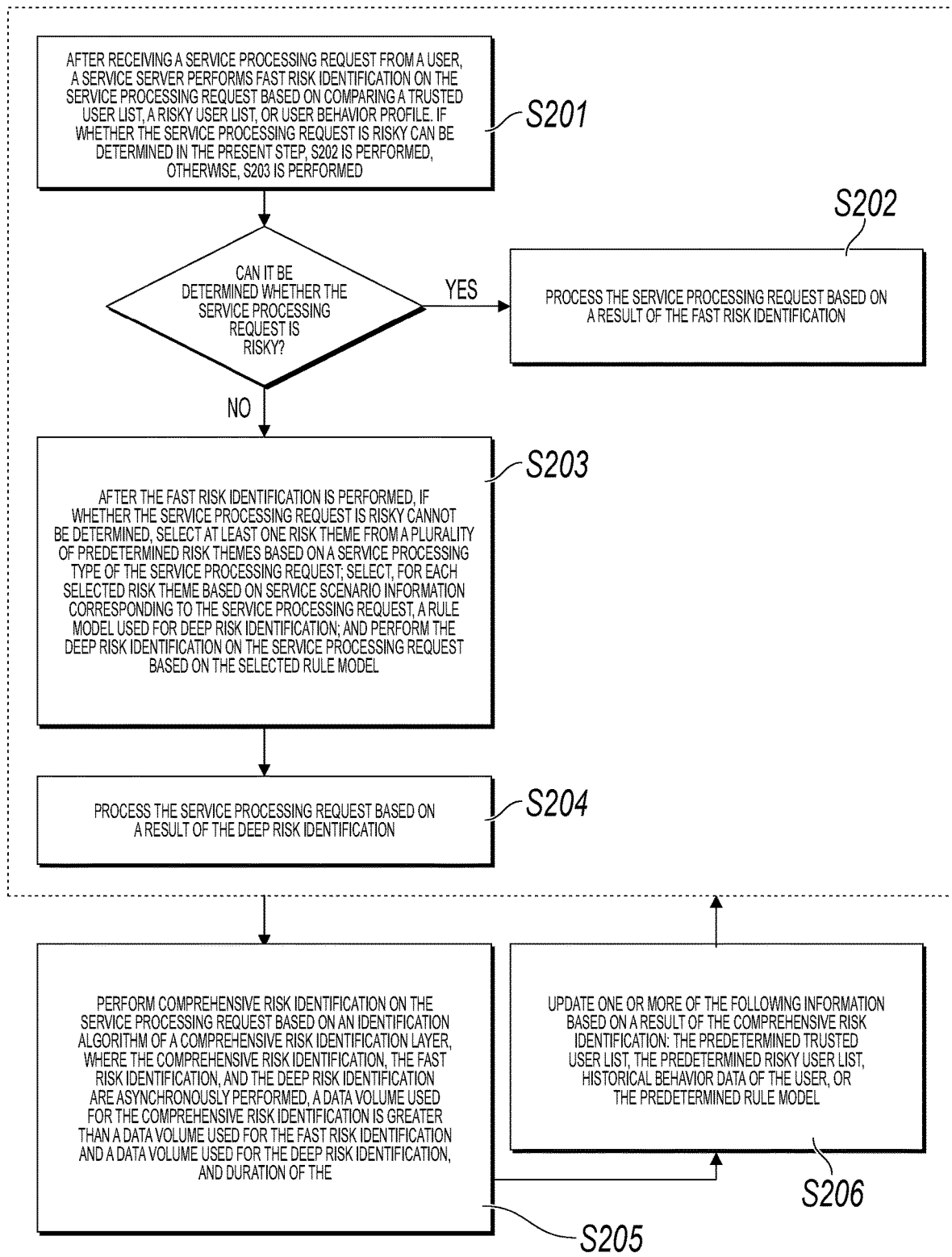
FIG. 2 is a flowchart illustrating a risk identification method, according to a second embodiment of the present application.

As shown in FIG. 2, FIG. 2 is a flowchart illustrating a risk identification method, according to Embodiment 2 of the present application. The method includes the following steps.

S201. After receiving a service processing request from a user, a service server performs fast risk identification on the service processing request based on comparing a trusted user list, a risky user list, or user behavior profile. If whether the service processing request is risky can be determined in the present step, S202 is performed; otherwise, S203 is performed.

In a specific implementation, whether the user data is user data included in the pre-stored trusted user list or risky user list is first determined based on user data included in the service processing request. If the user data is the user data included in the trusted user list, the service processing request is determined to be safe. If the user data is the user data included in the risky, user list, the service processing request is determined to be risky. If the user data is neither included in the pre-stored trusted user list nor the pre-stored risky user list, whether current operational behavior of the user indicated by the service processing request matches historical habitual operational behavior of the user is determined based on the user data included in the service processing request, historical behavior data of the user, and a rule model used for user behavior profile comparison. If yes, the service processing request is determined to be safe. If not, the service processing request is determined to be risky. Here, the historical habitual operational behavior of the user can be operational behavior in the user's historical behavior record that has occurred more often than a predetermined threshold.

S202. Process the service processing request based on a result of the fast risk identification.

In a specific implementation, if it is determined that the service processing request is safe, the service processing request is responded to, and a business service is provided for the user. If it is determined that the service processing request is risky, the service processing request can be rejected.

S203. After the fast risk identification is performed, if whether the service processing request is risky cannot be determined, select at least one risk type from a plurality of predetermined risk types based on a service processing type of the service processing request; select, for each selected risk type based on service scenario information corresponding to the service processing request, a rule model used for deep risk identification; and perform the deep risk identification on the service processing request based on the selected rule model.

S204. Process the service processing request based on a result of the deep risk identification.

Here, both the fast risk identification and the deep risk identification are online identification processes. If whether the service processing request is risky cannot be determined at a fast risk identification layer, it then needs to be determined at a deep risk identification layer, so as to process the service processing request based on an identification result. However, in consideration of a response time, data used for fast risk identification and deep risk identification are basically existing data available online, and a risk can still fail to be determined. For example, if the trusted user list is abnormal, fast risk identification results of subsequent service processing requests can be wrong. To perform more comprehensive risk mining, comprehensive risk identification is asynchronously performed in this embodiment of the present application. The comprehensive risk identification can be performed after the service processing request is processed, or can be performed during processing of the service processing request. In short, it does not affect the handling of the service processing request.

S205. Perform comprehensive risk identification on the service processing request based on an identification algorithm of a comprehensive risk identification layer, where the comprehensive risk identification, the fast risk identification, and the deep risk identification are asynchronously performed, a data volume used for the comprehensive risk identification is greater than a data volume used for the fast risk identification and a data volume used for the deep risk identification, and duration of the comprehensive risk identification is greater than duration of the fast risk identification and duration of the deep risk identification.

During the comprehensive risk identification, more data features can be calculated and identified by obtaining data of the user from other service websites of other servers. Compared with fast risk identification and deep risk identification, comprehensive risk identification includes more comprehensive and complex risk calculation and analysis, and can be more time-consuming.

For example, a comprehensive risk identification process can include: obtaining user data from another service website of another server and calculating user relationship network data, accumulated user behavior data, etc.; and performing comprehensive risk identification based on the obtained user data from the another service website, the calculated user relationship network data, the calculated accumulated user behavior data, user data used for the fast risk identification and the deep risk identification, etc.

Here, the algorithm of the comprehensive risk identification can be the same as the algorithm of the deep risk identification, and a difference lies in the user data used. The user data obtained from another server can include transaction and payment information of the user from an external service website. The information may indicate whether the user performed an abnormal operation on the external service website, etc. The user relationship network data includes data indicating whether the user has a direct relationship or an indirect relationship with another user. The accumulated user behavior data can include the number of logins performed by the user from a same IP address in specified time duration, a total remote payment amount within specific time duration, etc.

S206. Update one or more of the following information based on a result of the comprehensive risk identification: the predetermined trusted user list, the predetermined risky user list, historical behavior data of the user, or the predetermined rule model.

Here, the result of the comprehensive risk identification can be used to optimize the user data and the rule model used for fast risk identification and deep risk identification. For example, when a comprehensive risk identification result on a service processing request is that the service processing request is risky, an application account included in the service processing request can be retrieved, and added to the risky user list. As another example, for a service processing request whose corresponding IP address is included in the risky user list, if the comprehensive risk identification result is that the service processing request is safe, the IP address is removed from the risky user list. As another example, accumulated user behavior data obtained based on statistics collection can be added to user's historical behavior data. As another example, if statistics collected based on a plurality of service processing requests show that, an identification result output by an original rule model used for user behavior profile comparison and/or an identification result output by a rule model used for deep risk identification do not match well with the result of the comprehensive risk identification, the previously described rule model can be optimized based on the comprehensive risk identification result to better match the comprehensive risk identification result.

Based on the same inventive concept, an embodiment of the present application further provides a risk identification apparatus corresponding to the risk identification method. The problem-solving principle of the apparatus is similar to that of the risk identification method in this embodiment of the present application. Therefore, implementations of the apparatus can be referred to the implementation of the methods. Duplicate implementation details are not separately described here.

Figure 3:
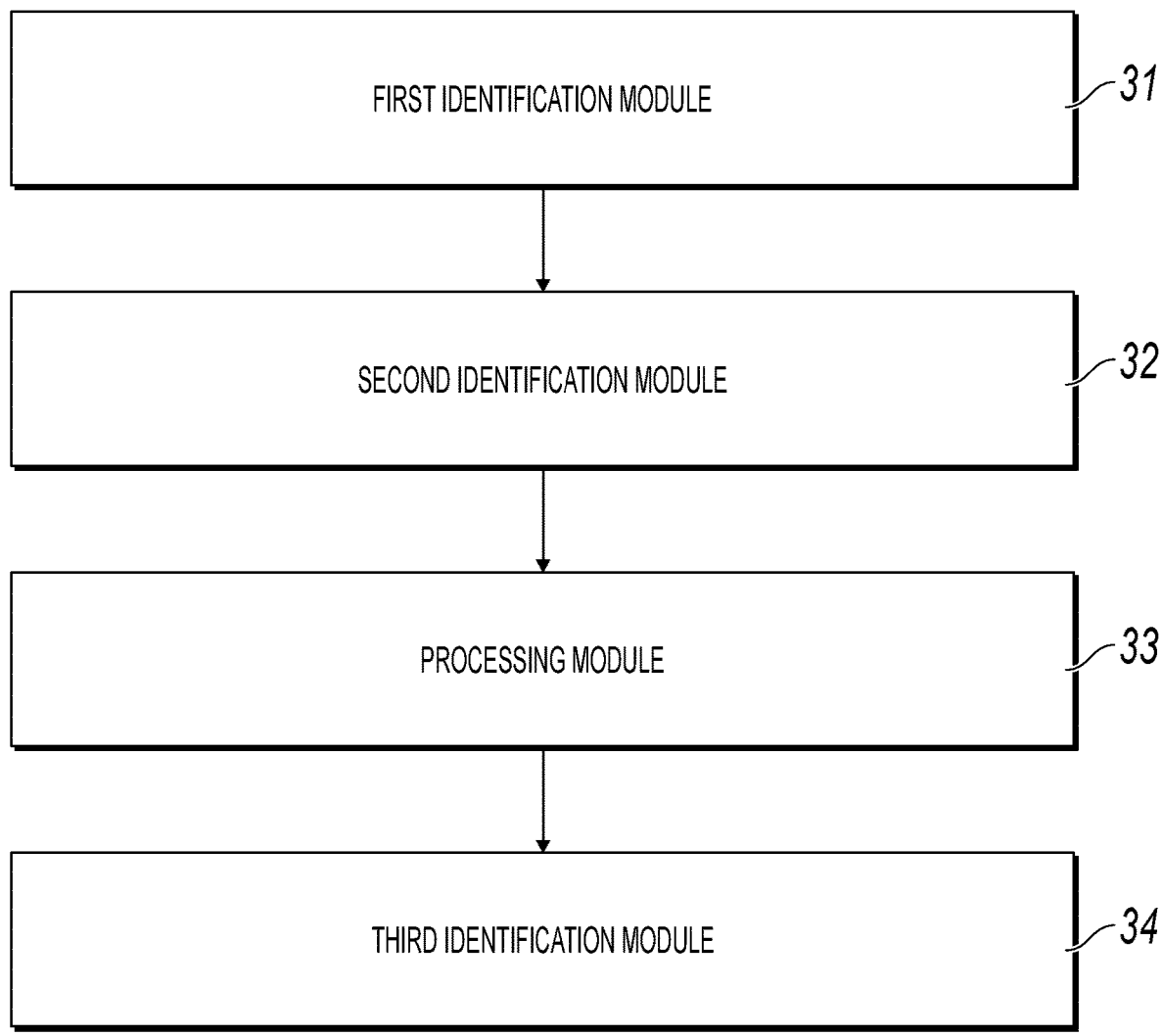
FIG. 3 is a schematic structural diagram illustrating a risk identification apparatus, according to an embodiment of the present application.

As shown in FIG. 3, FIG. 3 is a schematic structural diagram illustrating a risk identification apparatus according to an embodiment of the present application, including: a first identification module 31, configured to: after a service processing request of a user is received, perform fast risk identification on the service processing request based on an identification algorithm of a fast risk identification layer; a second identification module 32, configured to: after the fast risk identification is performed, if it cannot be determined whether the service processing request is risky, perform deep risk identification on the service processing request based on an identification algorithm of a deep risk identification layer, where a data volume used for the deep risk identification is greater than a data volume used for the fast risk identification, and duration of the deep risk identification is greater than duration of the fast risk identification; and a processing module 33, configured to process the service processing request based on a result of the deep risk identification.

Optionally, the first identification module 31 is specifically configured to: determine, based on user data included in the service processing request, whether the user data is user data in a pre-stored trusted user list or risky user list; and if the user data is the user data in the trusted user list, determine that the service processing request is safe; or if the user data is the user data in the risky user list, determine that the service processing request is risky.

Optionally, the first identification module 31 is specifically configured to: if the user data is neither the user data in the pre-stored trusted user list, nor the user data in the pre-stored risky user list, determine, based on the user data included in the service processing request, historical behavior data of the user, and a rule model used for user behavior profile comparison, whether current operational behavior of the user indicated by the service processing request matches historical habitual operational behavior of the user; and if yes, determine that the service processing request is safe; or if not, determine that the service processing request is risky.

Optionally, the second identification module 32 is specifically configured to: select at least one risk type from a plurality of predetermined risk types based on a service processing type of the service processing request; select, for each selected risk type based on service scenario information corresponding to the service processing request, a rule model used for deep risk identification; and perform the deep risk identification on the service processing request based on the selected rule model.

Optionally, the apparatus further includes: a third identification module 34, configured to: perform comprehensive risk identification on the service processing request based on an identification algorithm of a comprehensive risk identification layer, where the comprehensive risk identification, the fast risk identification, and the deep risk identification are asynchronously performed, a data volume used for the comprehensive risk identification is greater than the data volume used for the fast risk identification and the data volume used for the deep risk identification, and duration of the comprehensive risk identification is greater than the duration of the fast risk identification and the duration of the deep risk identification; and update one or more of the following information based on a result of the comprehensive risk identification: the predetermined trusted user list; the predetermined risky user list; the historical behavior data of the user; or the predetermined rule model.

A person skilled in the art should understand that the embodiments of the present application can be provided as a method, a system, or a computer program product. Therefore, the present application can use a form of hardware only embodiments, software only embodiments, or embodiments with a combination of software and hardware. In addition, the present application can use a form of a computer program product that is implemented on one or more computer-usable storage media (including but not limited to a disk memory, a CD-ROM, an optical memory, etc.) that includes computer-usable program code.

The present application is described with reference to the flowcharts and/or block diagrams of the method, the apparatus (system), and the computer program product according to the embodiments of the present application. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a special-purpose computer, an embedded processor, or a processor of any other programmable data processing device to generate a machine, so that the instructions executed by a computer or a processor of any other programmable data processing device generate an apparatus for implementing a specific function in one or more processes in the flowcharts or in one or more blocks in the block diagrams.

These computer program instructions can be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device, so that a series of operations and steps are performed on the computer or the another programmable device, thereby generating computer-implemented processing. Therefore, the instructions executed on the computer or the programmable device provide steps for implementing a specific function in one or more processes in the flowcharts or in one or more blocks in the block diagrams.

Although some preferred embodiments of the present application have been described, a person skilled in the art can make changes and modifications to these embodiments once they learn the basic inventive concept. Therefore, the following claims are intended to be construed as to cover the preferred embodiments and all changes and modifications falling within the scope of the present application.

A person skilled in the art can make various modifications and variations to the present application without departing from the spirit and scope of the present application. The present application is intended to cover these modifications and variations of the present application provided that they fall within the scope of protection described by the following claims and their equivalent technologies.

Figure 4:
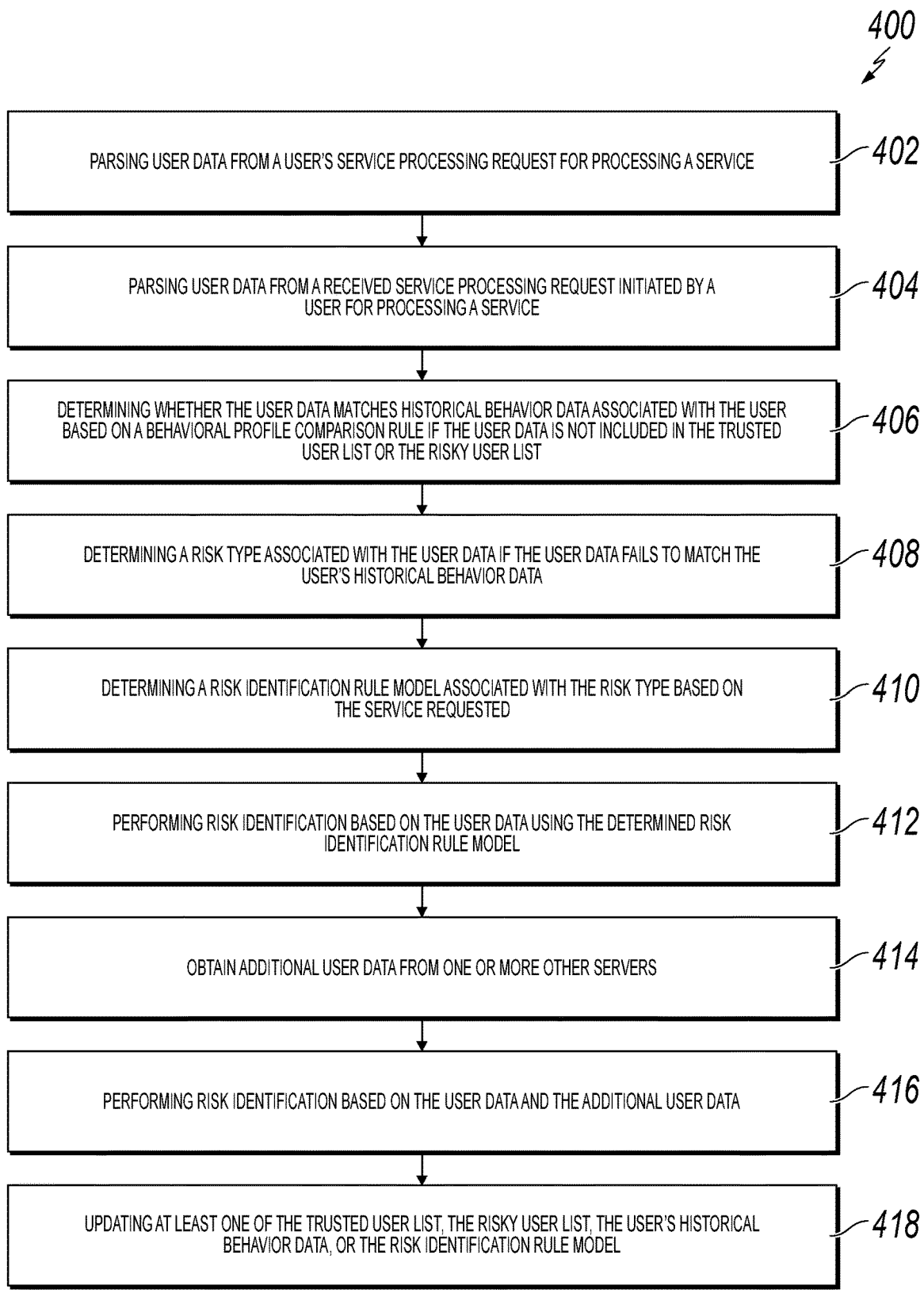
FIG. 4 is a flowchart illustrating an example of a computer-implemented method for service processing, according to an implementation of the present disclosure.

FIG. 4 is a flowchart illustrating an example of a method 400 of risk identification for service processing, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, user data from a received service processing request initiated by a user for processing a service is parsed. A user referred to in the present disclosure can be a person, an automated process, computer, or a combination of computers that can send requests and receive responses to the sent requests. From 402, method 400 proceeds to 404.

At 404, whether the user data is included in a trusted user list or a risky user list stored in a server for processing the service is determined. After receiving the user's service processing request, a service server performs fast risk identification on the service processing request based on a trusted user list, a risky user list, or the user's historical behavior data. In some implementations, whether the user data included in the service processing request matches user data included in the pre-stored trusted user list or the risky user list is determined based on user data included in the service processing request. If the user data matches the user data included in the trusted user list, the service processing request is determined to be safe. If the user data matches the user data included in the risky user list, the service processing request is determined to be risky. From 404, method 400 proceeds to 406.

At 406, whether the user data matches historical behavior data associated with the user is determined based on a behavioral profile comparison rule model if the user data is not included in the trusted user list or the risky user list. In some implementations, if the user data included in the service processing request matches neither the pre-stored user data of the trusted user list nor the pre-stored user data of the risky user list, then whether the current behavior is normal to the user can be determined based on determining whether the user data included in the service processing request matches historical behavior data or profile of the user. In some implementations, a rule model can be used for user behavior profile comparison. In some implementations, the historical behavior data of the user can be operation behaviors in the user's historical behavior record that has occurred more often than a predetermined threshold. If the behavior matches, the service processing request is determined to be safe. If not, the service processing request is determined to be risky. If it is determined that the service processing request is safe, the service processing request can be responded to, and a business service can be provided for the user. If it is determined that the service processing request is risky, the service processing request can be rejected. From 406, method 400 proceeds to 408.

At 408, a risk type associated with the user data is determined if the user data fails to match the user's historical behavior data. If the user data does not match the user data included in the trusted user list, the risky user list, nor the user's historical behavior data, the fast risk identification cannot determine whether the service processing request is risky. As such, a deep risk identification can be performed. From 408, method 400 proceeds to 410.

At 410, a risk identification rule model associated with the risk type is determined based on the service requested. To perform deep risk identification, at least one risk type from a plurality of predetermined risk types can be selected based on a service type of the service processing request. From 410, method 400 proceeds to 412.

At 412, risk identification is performed based on the user data using the determined risk identification rule model. For each risk type selected based on service processing type corresponding to the service processing request, a rule model used for deep risk identification can be determined. The deep risk identification of the service processing request can be performed based on the rule model. From 412, method 400 proceeds to 414.

At 414, additional user data is obtained from one or more other servers. In some implementations, data used for fast risk identification and deep risk identification can be data available at the server, which may not be enough to determine risk. For example, if the trusted user list is abnormal, fast risk identification results of subsequent service processing requests can be wrong. To perform more comprehensive risk determination, comprehensive risk identification can also be performed in parallel to fast risk identification or deep risk identification. In some cases, the comprehensive risk identification can also be performed after the service processing request is processed, or it can be performed during the processing of the service processing request. The performance of the comprehensive risk identification does not need to affect other processes related to the service processing request. During the comprehensive risk identification, more data features can be calculated and identified by obtaining data of the user from other servers. For example, a comprehensive risk identification process can include obtaining user data from another server and calculating user relationship network data, accumulated user behavior data. The user data from other servers may indicate whether the user performed an abnormal operation on the servers. The user relationship network data can include data indicating whether the user has a direct relationship or an indirect relationship with another user. The accumulated user behavior data can include information such as the number of logins performed by the user from a same IP address in a specified time duration or a total remote payment amount within specific time duration. From 414, method 400 proceeds to 416.

At 416, risk identification is performed based on the user data and the additional user data. Comprehensive risk identification can be performed based on user data obtained from other servers, the user relationship network data, the accumulated user behavior data, and user data used for fast risk identification and deep risk identification. The algorithm used for comprehensive risk identification can be the same or different the deep risk identification based on the user data used. From 416, method 400 proceeds to 418.

At 418, at least one of the trusted user list, the risky user list, the user's historical behavior data, or the risk identification rule model is updated. The result of the comprehensive risk identification can be used to update user data and the rule model used for fast risk identification or deep risk identification. After 418, method 400 stops.

Implementations of the subject matter described in this specification can be implemented so as to realize particular advantages or technical effects. For example, implementations of the subject matter permits improvement of risk identification efficiency and reduction of system resource consumption. By performing relatively complex deep risk identification on a service processing request if fast risk identification does not suffice, risk identification accuracy can be improved. Moreover, a comprehensive risk identification can be performed asynchronously with fast risk identification and deep risk identification to form an enhanced risk identification algorithm while ensuring smooth service processing.

The described methodology permits enhancement of various mobile computing device data security. Service providers can process user service request sent by mobile computing devices to perform risk analysis to ensure the user is authorized so that the legitimate users will not be victims of fraud.

The described methodology can ensure the efficient usage of computer resources (for example, processing cycles, network bandwidth, and memory usage), through the optimized layered risk identification algorithm. Deep risk identification or comprehensive risk identification can be performed only when necessary. At least these actions can minimize or prevent waste of available computer resources and achieve a better balance between resource consumption and data security.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general—and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly, (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
parsing user data from a received service processing request initiated by a user for processing a service, wherein the user data includes service processing type information and service scenario information; and
performing hierarchical risk identification on the received service processing request, wherein the hierarchical risk identification includes a fast risk identification, a deep risk identification, and a comprehensive risk identification, and performing the hierarchical risk identification comprises:
  determining that the user data is not included in a trusted user list or a risky user list stored in a server that processes the service, wherein the trusted user list includes at least one of a previously-used Internet Protocol (IP) address, a previously-used Media Access Control (MAC) address, or a previously-identified user location associated with the user, and wherein the risky user list includes at least one of a previously-identified risky user account, a previously-identified risky user bank card number, or a previously-identified risky user IP address;
  in response to determining that the user data is not included in the trusted user list or the risky user list, determining, based on a behavioral profile comparison rule model, that the user data fails to match historical behavior data associated with the user;
  in response to determining that the user data fails to match the historical behavior data, determining a risk type from a plurality of predetermined risk types based on the service processing type information in the user data;
  determining a risk identification rule model associated with the risk type based on the service scenario information in the user data;
  performing risk identification based on the user data using the determined risk identification rule model; and
  processing the service by the server based on a result of the risk identification.

2. The computer-implemented method of claim 1, further comprising:
obtaining additional user data from one or more other servers;
performing risk identification based on the user data and the additional user data; and
updating at least one of the trusted user list, the risky user list, the historical behavior data, or the risk identification rule model.

3. The computer-implemented method of claim 2, wherein the additional user data includes at least one of service data associated with one or more services provided by the one or more other servers, user exchange data that identifies data exchange between the user and one or more other users, or user-accumulated behavior data that identifies a number of times that a type of behavior associated with the user occurs.

4. The computer-implemented method of claim 1, further comprising processing the service based on the user's service processing request if the user data is included in the trusted user list.

5. The computer-implemented method of claim 1, further comprising rejecting the user's service processing request if the user data is included in the risky user list.

6. The computer-implemented method of claim 1, further comprising processing the service based on the user's service processing request if the user data matches the user's historical behavior data.

7. The computer-implemented method of claim 1, wherein a first data volume used for the comprehensive risk identification is greater than a second data volume used for the deep risk identification.

8. The computer-implemented method of claim 1, wherein a first duration of the comprehensive risk identification is greater than a second duration of the deep risk identification.

9. The computer-implemented method of claim 1, wherein the deep risk identification and the comprehensive risk identification are performed based on a same identification process, and wherein different user date are used for performing the deep risk identification and the comprehensive risk identification.

10. The computer-implemented method of claim 1, wherein the service processing type information includes at least one of fund transfer, payment, or sending red packet.

11. The computer-implemented method of claim 1, wherein the service scenario information includes at least one of transaction type information, payment method information, logistics type information, or transaction party information.

12. A non-transitory, computer-readable medium storing one or more instructions executable by a computer system to perform operations comprising:
parsing user data from a received service processing request initiated by a user for processing a service, wherein the user data includes service processing type information and service scenario information; and
performing hierarchical risk identification on the received service processing request, wherein the hierarchical risk identification includes a fast risk identification, a deep risk identification, and a comprehensive risk identification, and performing the hierarchical risk identification comprises:
  determining that the user data is not included in a trusted user list or a risky user list stored in a server that processes the service, wherein the trusted user list includes at least one of a previously-used Internet Protocol (IP) address, a previously-used Media Access Control (MAC) address, or a previously-identified user location associated with the user, and wherein the risky user list includes at least one of a previously-identified risky user account, a previously-identified risky user bank card number, or a previously-identified risky user IP address;
  in response to determining that the user data is not included in the trusted user list or the risky user list, determining, based on a behavioral profile comparison rule model, that the user data fails to match historical behavior data associated with the user;
  in response to determining that the user data fails to match the historical behavior data, determining a risk type from a plurality of predetermined risk types based on the service processing type information in the user data;
  determining a risk identification rule model associated with the risk type based on the service scenario information in the user data;

performing risk identification based on the user data using the determined risk identification rule model; and processing the service by the server based on a result of the risk identification.

13. The non-transitory, computer-readable medium of claim 12, further comprising one or more instructions to:

obtain additional user data from one or more other servers;

perform risk identification based on the user data and the additional user data; and update at least one of the trusted user list, the risky user list, the historical behavior data, or the risk identification rule model.

14. The non-transitory, computer-readable medium of claim 13, wherein the additional user data includes at least one of service data associated with one or more services provided by the one or more other servers, user exchange data that identifies data exchange between the user and one or more other users, or user-accumulated behavior data that identifies a number of times that a type of behavior associated with the user occurs.

15. The non-transitory, computer-readable medium of claim 12, further comprising one or more instructions to process the service based on the user's service processing request if the user data is included in the trusted user list.

16. The non-transitory, computer-readable medium of claim 12, further comprising one or more instructions to reject the user's service processing request if the user data is included in the risky user list.

17. The non-transitory, computer-readable medium of claim 12, further comprising one or more instructions to process the service based on the user's service processing request if the user data matches the user's historical behavior data.

18. A computer-implemented system, comprising:

one or more computers; and one or more computer memory devices interoperably coupled with the one or more computers and having tangible, non-transitory, computer-readable media storing one or more instructions that, when executed by the one or more computers, perform one or more operations comprising:

parsing user data from a received service processing request initiated by a user for processing a service, wherein the user data includes service processing type information and service scenario information; and performing hierarchical risk identification on the received service processing request, wherein the hierarchical risk identification includes a fast risk identification, a deep risk identification, and a comprehensive risk identification, and performing the hierarchical risk identification comprises:

determining that the user data is not included in a trusted user list or a risky user list stored in a server that processes the service, wherein the trusted user list includes at least one of a previously-used Internet Protocol (IP) address, a previously-used Media Access Control (MAC) address, or a previously-identified user location associated with the user, and wherein the risky user list includes at least one of a previously-identified risky user account, a previously-identified risky user bank card number, or a previously-identified risky user IP address;

in response to determining that the user data is not included in the trusted user list or the risky user list, determining, based on a behavioral profile comparison rule model, that the user data fails to match historical behavior data associated with the user;

in response to determining that the user data fails to match the historical behavior data, determining a risk type from a plurality of predetermined risk types based on the service processing type information in the user data;

determining a risk identification rule model associated with the risk type based on the service scenario information in the user data;

performing risk identification based on the user data using the determined risk identification rule model; and processing the service by the server based on a result of the risk identification.

19. The computer-implemented system of claim 18, further comprising one or more operations to:

obtain additional user data from one or more other servers;

perform risk identification based on the user data and the additional user data; and update at least one of the trusted user list, the risky user list, the historical behavior data, or the risk identification rule model.

20. The computer-implemented system of claim 19, wherein the additional user data includes at least one of service data associated with one or more services provided by the one or more other servers, user exchange data that identifies data exchange between the user and one or more other users, or user-accumulated behavior data that identifies a number of times that a type of behavior associated with the user occurs.

* * * * *